US012151478B2

(12) United States Patent
Miwa

(10) Patent No.: US 12,151,478 B2
(45) Date of Patent: Nov. 26, 2024

(54) HEAD MODULE, LIQUID DISCHARGE HEAD, AND LIQUID DISCHARGE APPARATUS

(71) Applicant: Keishi Miwa, Kanagawa (JP)

(72) Inventor: Keishi Miwa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 133 days.

(21) Appl. No.: 17/956,838

(22) Filed: Sep. 30, 2022

(65) Prior Publication Data

US 2023/0106664 A1 Apr. 6, 2023

(30) Foreign Application Priority Data

Oct. 6, 2021 (JP) ................................ 2021-164948

(51) Int. Cl.
*B41J 2/14* (2006.01)
*B41J 2/145* (2006.01)

(52) U.S. Cl.
CPC ......... *B41J 2/1433* (2013.01); *B41J 2/14233* (2013.01); *B41J 2/145* (2013.01); *B41J 2002/14306* (2013.01); *B41J 2002/14491* (2013.01)

(58) Field of Classification Search
CPC ...... B41J 2/1433; B41J 2/14233; B41J 2/145; B41J 2002/14306; B41J 2002/14491; B41J 2/1606; B41J 2002/14362; B41J 2202/20; B41J 2202/21
See application file for complete search history.

(56) References Cited

U.S. PATENT DOCUMENTS

| | | | |
|---|---|---|---|
| 2008/0055362 A1 | 3/2008 | Irinoda | |
| 2015/0171307 A1 | 6/2015 | Masuda et al. | |
| 2016/0001556 A1 | 1/2016 | Masuda et al. | |
| 2017/0100934 A1 | 4/2017 | Masuda et al. | |
| 2019/0275796 A1 | 9/2019 | Miwa | |
| 2020/0171829 A1 | 6/2020 | Kinokuni | |
| 2020/0269575 A1* | 8/2020 | Kobayashi | B41J 2/14233 |
| 2020/0298569 A1 | 9/2020 | Miwa | |
| 2020/0298570 A1 | 9/2020 | Masuda et al. | |
| 2021/0016588 A1 | 1/2021 | Miwa | |
| 2021/0036208 A1 | 2/2021 | Shimofuku et al. | |
| 2021/0162759 A1 | 6/2021 | Miwa et al. | |
| 2021/0370675 A1 | 12/2021 | Yoshita et al. | |

FOREIGN PATENT DOCUMENTS

| | | |
|---|---|---|
| JP | 2008-055828 | 3/2008 |
| JP | 2020-093516 | 6/2020 |

* cited by examiner

*Primary Examiner* — Lisa Solomon
(74) *Attorney, Agent, or Firm* — XSENSUS LLP

(57) ABSTRACT

A head module includes: a head including: a nozzle plate having a nozzle from which a liquid is to be discharged; a channel substrate including an individual channel communicating with the nozzle, the nozzle plate bonded to a first bonding surface of the channel substrate; and a cover covering at least one side of a discharge surface of the nozzle plate of the head. The channel substrate has a size larger than the nozzle plate, the cover has a second bonding surface bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

18 Claims, 5 Drawing Sheets

HEAD MODULE, LIQUID DISCHARGE HEAD, AND LIQUID DISCHARGE APPARATUS

CROSS-REFERENCE TO RELATED APPLICATIONS

This Patent application is based on and claims priority pursuant to 35 U.S.C. § 119(a) to Japanese Patent Application No. 2021-164948, filed on Oct. 6, 2021, in the Japan Patent Office, the entire disclosure of which is hereby incorporated by reference herein.

BACKGROUND

Technical Field

Embodiments of this disclosure relate to a head module, a liquid discharge head, and a liquid discharge apparatus.

Related Art

As a liquid discharge head which discharges liquid, or a head module, there is the liquid discharge head or the head module that includes a cover that covers a peripheral portion of a nozzle surface in which nozzles are formed.

The liquid discharge head or the head module includes a channel substrate and a cover bonded together by an adhesive.

SUMMARY

A head module includes: a head including: a nozzle plate having a nozzle from which a liquid is to be discharged; a channel substrate including an individual channel communicating with the nozzle, the nozzle plate bonded to a first bonding surface of the channel substrate; and a cover covering at least one side of a discharge surface of the nozzle plate of the head. The channel substrate has a size larger than the nozzle plate, the cover has a second bonding surface bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

A liquid discharge head includes: a nozzle plate having a nozzle from which a liquid is to be discharged; a channel substrate including an individual channel communicating with the nozzle, the nozzle plate bonded to a first bonding surface of the channel substrate; and a cover covering at least one side of a discharge surface of the nozzle plate. The channel substrate has a size larger than the nozzle plate, the cover has a second bonding surface bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

A liquid discharge apparatus includes the head module.

A liquid discharge apparatus includes the liquid discharge head.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 6A:
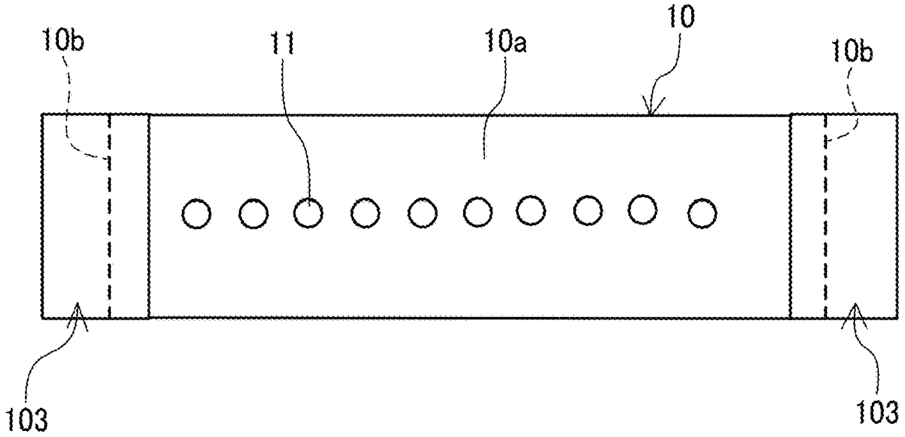
Figure 6B:
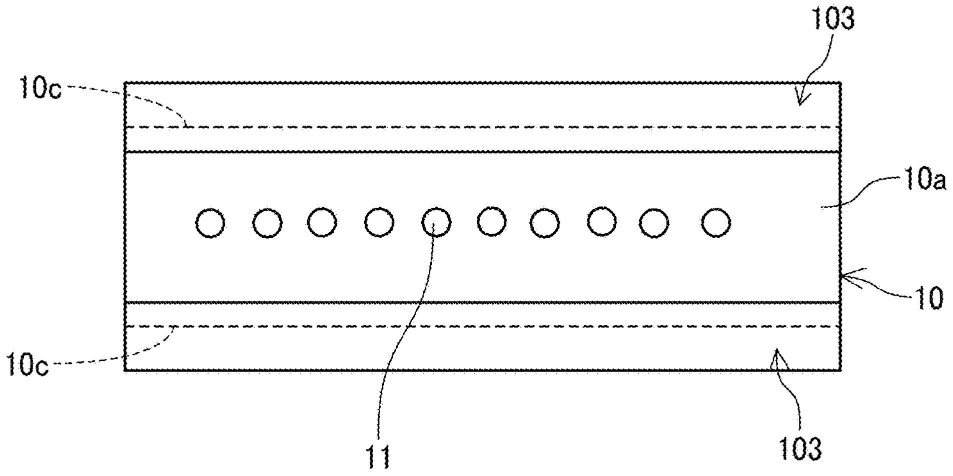
Figure 7:
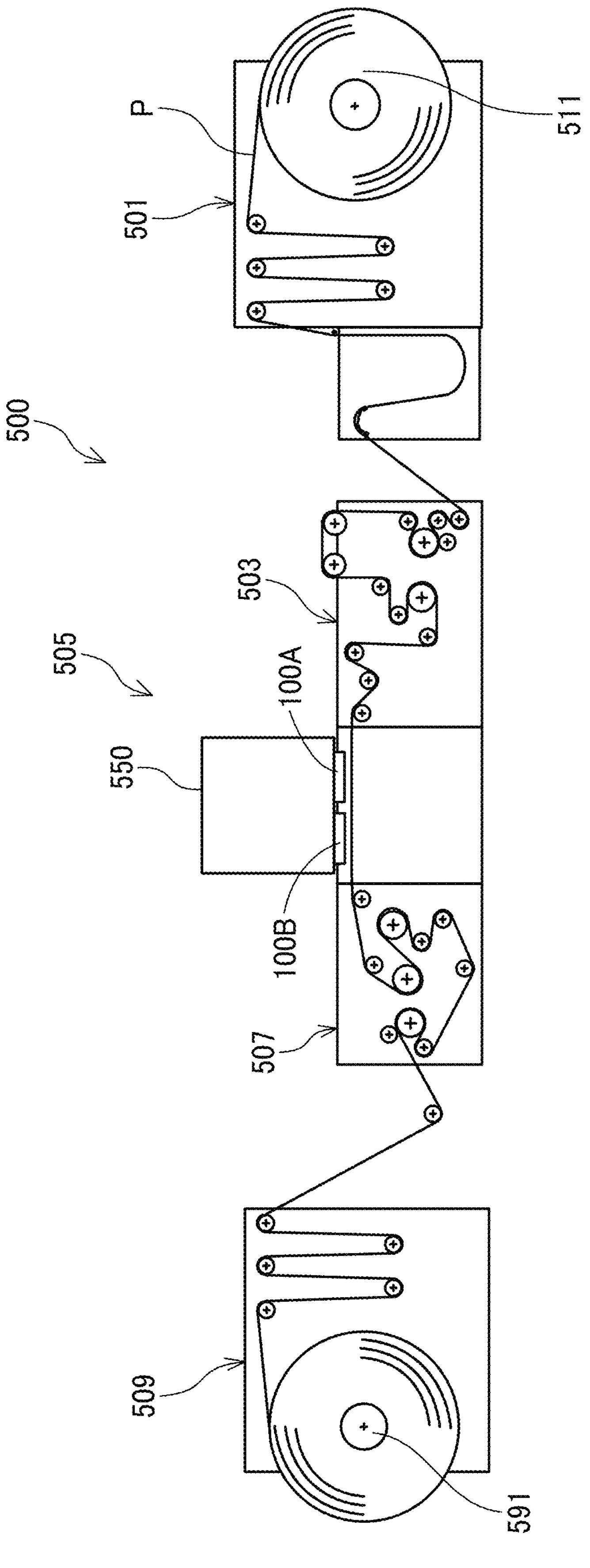
Figure 8:
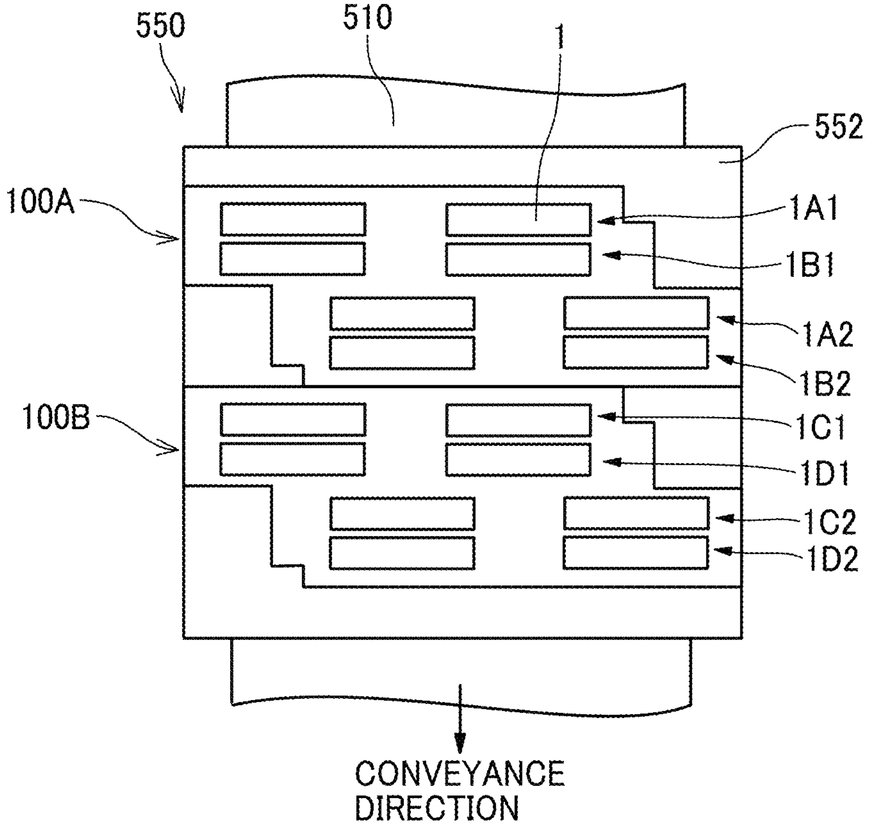

Each of FIGS. 6A and 6B (FIG. 6) is a plan view of a discharge surface portion of one head corresponding to a different example in a third embodiment of the present embodiment;

FIG. 7 is a schematic explanatory diagram of an example of a liquid discharge apparatus according to the present embodiment; and FIG. 8 is a plan view of an example of a head unit of the apparatus.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Figure 1:
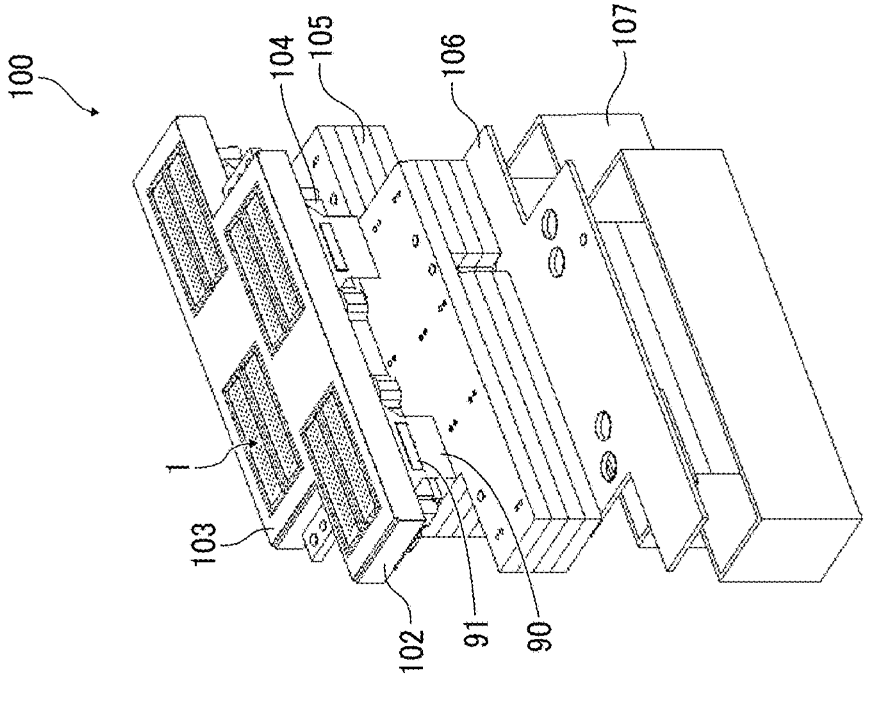
FIG. 1 is an exploded perspective view of a head module according to a first embodiment of the present embodiment.
Figure 2:
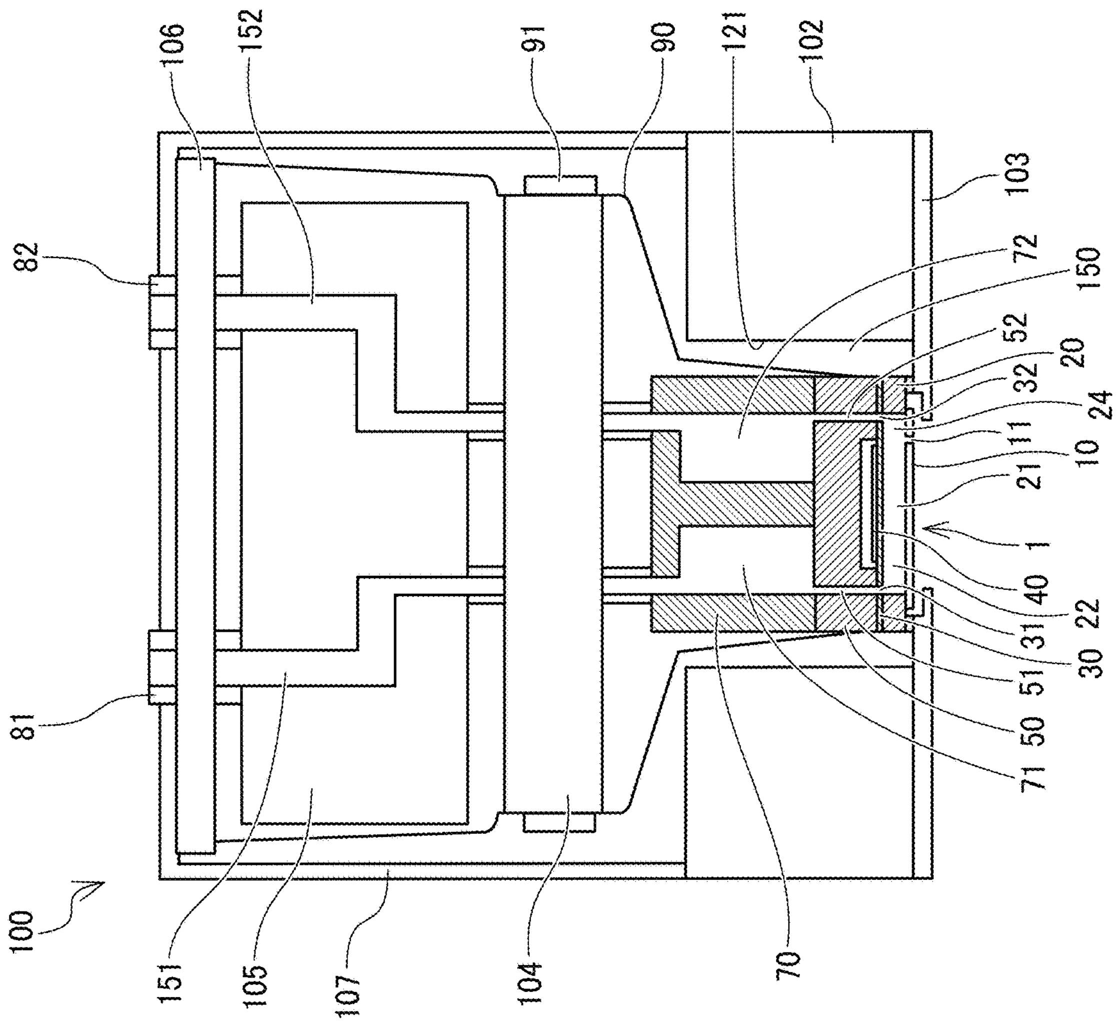
FIG. 2 is a cross-sectional view of one head in the head module taken along a lateral direction of the head.

Embodiments of the present disclosure are described below with reference to the accompanying drawings. Referring to FIGS. 1 and 2, a head module according to a first embodiment of the present embodiment is described.

FIG. 1 is an exploded perspective view for describing the head module according to this embodiment.

FIG. 2 is a cross-sectional view of one head in the head module taken along a lateral direction of the head.

A head module 100 includes: a plurality of (multiple) heads I which discharge liquid; a base 102; a cover 103; a heat dissipation member 104; a manifold 105; a printed circuit board 106 (PCB); and a module case 107.

The head 1 includes: a nozzle plate 10 in which at least one nozzle 11 is formed; a channel substrate 201 which forms an individual channel, such as a pressure chamber 21, communicating with the nozzle 11; and a diaphragm 30 including a piezoelectric element 40 which serves as a driving means for pressurizing the liquid in the pressure chamber 21. Also, the head 1 includes, for example, an intermediate channel plate 50 stacked on the diaphragm 30, and a common channel member 70 stacked on the intermediate channel plate 50. The common channel member 70 constitutes a frame member of a single head 1.

The channel substrate 20 forms, in addition to the pressure chamber 21, an individual supply channel 22 which communicates with the pressure chamber 21, and an individual recovery channel 24 which communicates with the pressure chamber 21.

The intermediate channel plate 50 forms an intermediate supply channel 51 which communicates with the individual supply channel 22 via an opening 31 of the diaphragm 30, and an intermediate recovery channel 52 which communicates with the individual recovery channel 24 via an opening 32 of the diaphragm 30.

The common channel member 70 forms a common supply channel 71 which communicates with the intermediate supply channel 51, and a common recovery channel 72 which communicates with the intermediate recovery channel 52. The common supply channel 71 communicates with a supply port 81 via a channel 151 of the manifold 105. The common recovery channel 72 communicates with a recovery port 82 via a channel 152 of the manifold 105.

The printed circuit board 106 and the piezoelectric element 40 of the head 1 are coupled via a flexible wiring member 90, and a driver IC (a drive circuit) 91 is mounted on the flexible wiring member 90.

The plurality of heads 1 are each inserted into an opening portion 121 of the base 102, and the cover 103, which is bonded and secured to the base 102, is bonded to the channel substrate 20 of the head 1 by an adhesive and is secured to the channel substrate 20.

The cover 103 includes an opening portion corresponding to an area of the nozzle 11 of the nozzle plate 10, and the cover 103 covers a peripheral portion of the nozzle plate 10 of the head 1. As long as the cover 103 covers an edge part on at least one side of the nozzle plate 10, the present embodiment can be applied.

The base 102 is a member that is disposed with a space 150 interposed between a sidewall surface of the channel substrate 20 and the base 102, and a part of the flexible wiring member 90 is disposed within the space 150.

Further, in a longitudinal direction of the head 1, a flange portion, which is provided on the outside of the common channel member 70, is bonded and secured to the base 102.

Figure 3:
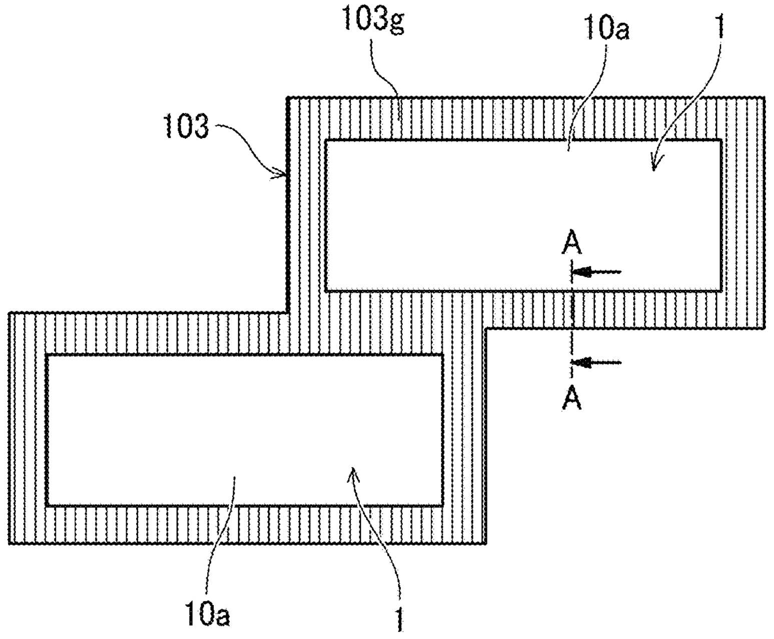
FIG. 3 is a plan view of two head parts presented for describing bonding of a cover in the first embodiment.
Figure 4:
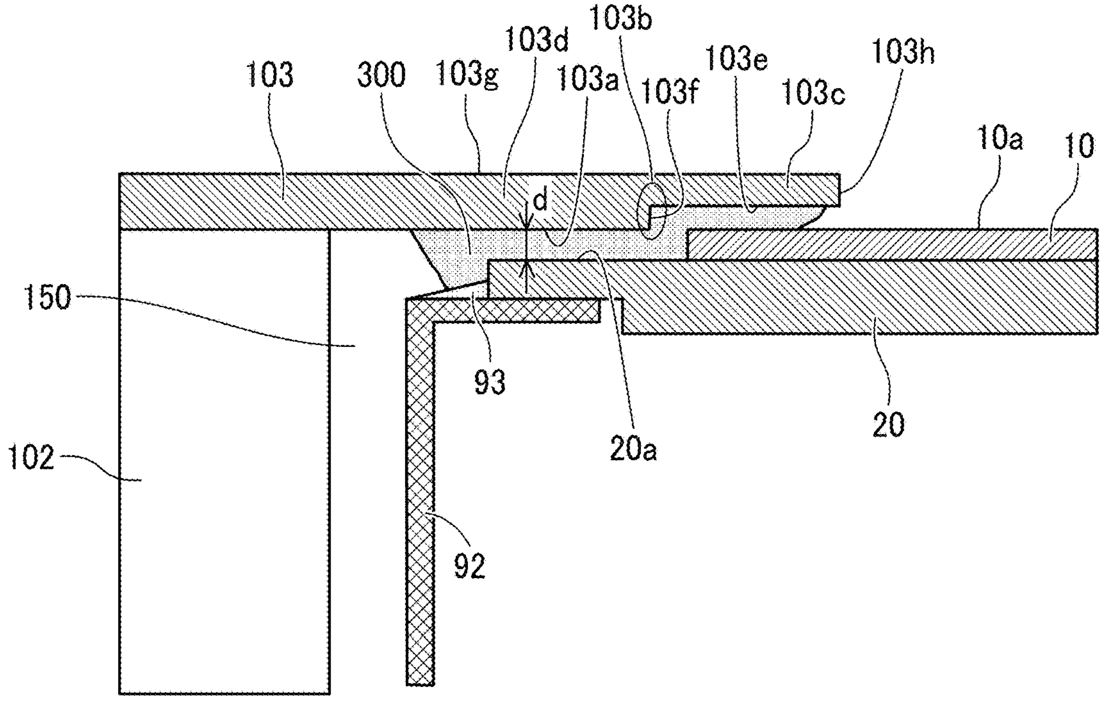
FIG. 4 is a cross-sectional view of a main part taken along line A-A of FIG. 3.

Next, the bonding of the cover in the first embodiment is described referring to FIGS. 3 and 4.

FIG. 3 is a plan view of two head parts presented for describing the bonding of the cover 103.

FIG. 4 is a cross-sectional view of a main part of the head module 100 along line A-A of FIG. 3.

The outer shape of the nozzle plate 10 of the head 1 is smaller than the outer shape of the channel substrate 20 as seen in plan view. In the cover 103, a bonding surface 103*a* is bonded to a bonding surface 20*a*, which is at an outer region of the nozzle plate 10, on the side on the nozzle plate 10 side of the channel substrate 20, by an adhesive 3).

In the present embodiment, the bonding surface 103*a* of the cover 103 at which the bonding surface 103*a* is bonded to the bonding surface 20*a* of the channel substrate 20 is located closer to the channel substrate 20 than a discharge surface 10*a* of the nozzle plate 10.

Further, the cover 103 includes a step portion 103*b* provided on the side facing the channel substrate 20. The step portion 103*b* is configured from the bonding surface 103*a* that is bonded to the channel substrate 20, a facing surface 103*e* of a part facing a peripheral portion of the discharge surface 10*a* of the nozzle plate 10, and a surface 103*f* which joins the bonding surface 103*a* and the facing surface 103*e* to each other.

By the presence of the step portion 103*b*, in the cover 103, the thickness of the part facing the peripheral portion of the discharge surface 10*a* of the nozzle plate 10 is made smaller than the thickness of a part 103*d* that is bonded to the channel substrate 20. Thus, the part facing the peripheral portion of the discharge surface 10*a* of the nozzle plate 10 has the shape of eaves. Thus the part is also referred to as an eaves shaped part.

Here, the part which constitutes the step portion 103*b* may be configured as an inclined portion.

Now, liquid repellency (water repellency) and lyophilic properties (hydrophilic properties) of each surface of the nozzle plate 10, the channel substrate 20, and the cover 103, for example, are described.

A liquid-repellent film or the like is formed on a surface of the nozzle plate 10, and thus the surface of the nozzle plate 10 is liquid-repellent.

Each of the bonding surfaces 20*a* and 103*a* at which the channel substrate 20 and the cover 103 are bonded together is lyophilic.

In the cover 103, the facing surface 103*e* of the part (eaves-shaped part) facing the nozzle plate 10 is lyophilic. Thus, the cover 103 has a lyophilic surface 103*e* facing the nozzle plate 10.

In the cover 103, a surface 103*g* on the opposite side of the bonding surface 103*a* that is bonded to the channel substrate 20 is liquid-repellent.

Owing to such a configuration, the adhesive 300 which bonds the channel substrate 20 and the cover 103 together is more likely to remain at the parts of the lyophilic bonding surfaces 20*a* and 103*a*, and movement of the adhesive 300 to the liquid-repellent discharge surface 10*a* of the nozzle plate 10 is suppressed.

By this feature, protrusion of the adhesive 300 to the surface (discharge surface) of the nozzle plate 10 can be suppressed.

The above feature is specifically described below.

The periphery of the cover 103 and the channel substrate 20 is bonded by the adhesive 300 to prevent liquid from entering from outside. Further, in order to protect the head 1 from colliding with a medium during printing, the cover 103 is also bonded to the base 102 by an adhesive.

In a bonded part of the cover 103 and the base 102, tight adhesive bonding without a gap is achieved. However, in order to prevent the channel substrate 20 from being damaged during the bonding, the bonding is performed in such a state that a gap "d" is secured between the bonding surface 103*a* of the cover 103 and the bonding surface 20*a* of the channel substrate 20.

At this time, dimensional variations of components, and variations caused during head assembly, for example, cause the gap d to be varied. Accordingly, when the adhesive 300 is applied at a fixed application quantity, if the gap d is large in height (wide), protrusion of the adhesive 300 is small. However, it becomes difficult to seal between the bonding surfaces 103*a* and 20*a*. In contrast, if the gap d is small in height (narrow), while it becomes easy to seal between the bonding surfaces 103*a* and 20*a*, the adhesive 300 is more likely to protrude.

Therefore, it is possible to control the protrusion and sealing by measuring the height of the base 102 and the channel substrate 20 each time the bonding is to be performed, and determining the application quantity in accordance with the measured height.

However, the disadvantages of this method are, for example, the need of a precise measuring instrument and increase of a workload of the measurement, and occurrence of adhesion of foreign substances during the measurement. Therefore, regardless of whether there are variations in the gap d, it is preferable that sealing and protrusion can be controlled when the adhesive is applied under a certain adhesive application condition.

Here, in order to completely fill the gap d, it is preferable that a generous amount of the adhesive 300 be applied to the respective bonding surfaces 103*a* and 20*a* of the cover 103 and the channel substrate 20.

However, in terms of the height, if the bonding surface 20*a* of the channel substrate 20 is near the bonding surface of the base 102 at which the base 102 is bonded to the cover 103, the gap d is narrowed. Thus, the adhesive 300 is more likely to protrude to the surface (discharge surface 10*a*) of the nozzle plate 10.

In addition, the adhesive 300 which has protruded to the discharge surface 10*a* of the nozzle plate 10 may turn into foreign substances as a result of being scraped off by a wiping member at the time of wiping. Further, an adhesive component may gradually dissolve as a result of being in contact with the liquid for a long time, and the dissolved component may adhere to the discharge surface 10*a* of the nozzle plate 10. As a result, such foreign substances or adhesion of the dissolved component prevents a normal meniscus from being formed at the nozzle 11, and an ejection failure may be caused.

In contrast, in terms of the height, if the bonding surface 20*a* of the channel substrate 20 is far from the bonding surface of the base 102 at which the base 102 is bonded to the cover 103, the adhesive 300 is applied in an amount sufficient to fill the gap d.

In this case, in order to reduce residual stress, preferably, a room-temperature curing adhesive that cures at room temperature may be used as the adhesive 3M). However, if the adhesive 300 of a room-temperature curing type is used, it takes time to cure. Thus, the adhesive 300 may flow during the curing and form a leakage path.

In particular, as illustrated in FIG. 4, in a case where the cover 103 is to be bonded to the channel substrate 20 with the cover 103 being on top of the channel substrate 20, and curing is to be performed in that state, a leakage path caused by a flow of an adhesive during the curing is likely to occur.

In view of the above, preferably, the head module 100 may be configured such that the adhesive 300 is prevented from protruding to the discharge surface 10*a* side of the nozzle plate 10 even if the height of the gap d is varied or a generous amount of the adhesive 30) is applied. Moreover, the head module 100 may be configured such that when the quantity of the adhesive 300 applied is a minimum quantity for filling most part of the gap d, the adhesive 300 stays at the position where the adhesive 300 is applied during the curing of the adhesive 300.

Therefore, in the present embodiment, in order to suppress protrusion of the adhesive 300 toward the discharge surface 10*a* of the nozzle plate 10, the part, which faces the nozzle plate 10, of the cover 103 is made eaves-shaped.

By this structure, even when the quantity of protrusion of the adhesive 300 is large, the adhesive 300 is retained in the part (eaves-shaped part), and the adhesive 300 is less likely to protrude toward the discharge surface 10*a* of the nozzle plate 10.

In addition, the bonding surface 103*a*, which is the surface bonded to the bonding surface 20*a* of the channel substrate 20, of the cover 103 is made lyophilic, and the part (discharge surface 10*a*), which overlaps with the cover 103, of the nozzle plate 10 is made liquid-repellent.

By this feature, the adhesive 300 that protrudes from between the nozzle plate 10 and the cover 103 does not spread over the discharge surface 10*a* of the nozzle plate 10.

Furthermore, the surface 103*g* of the cover 103 (i.e., a face on the opposite side of the bonding surface 103*a* that is bonded to the channel substrate 20) is made liquid-repellent (liquid-repellent surface).

By this feature, even if a large amount of the adhesive 300 protrudes from between the nozzle plate 10 and the cover 103, the adhesive 300 stops at an edge 103*h* of the cover 103.

Also, in the present embodiment, a part of an electrical member 92 including the flexible wiring member 90 and the drive circuit 91 is disposed within the space 150 between the sidewall surface of the channel substrate 20 and the base 102. Further, a fluorine resin 93 is applied to a surface of the electrical member 92, and liquid repellency is thus imparted to the surface of the electrical member 92.

By this feature, a flow of the adhesive 300 between the nozzle plate 10 and the cover 103 toward the electrical member 92 is suppressed.

By achieving such surface properties (liquid repellency and lyophilic properties), even if the height of the gap d between the cover 103 and the channel substrate 20 is varied due to variations in component dimensions and variations caused during the assembly, etc., it is possible to widen the range of application quantity that satisfies both adequate sealing and protrusion suppression, and the manufacturing is facilitated.

Further, even if the quantity of the adhesive 300 applied is below a control range, the possibility of being defective can be greatly reduced. It is therefore possible to suppress protrusion of an adhesive, and leakage due to an adhesive outflow within the range that can be adjusted by optimizing the adhesive application process.

Next, comparative examples and an Example are described.

As Comparative Example 1, a head, which does not have the part (eaves-shaped part) of the cover 103 of the above-described embodiment, and in which a liquid-repellent film is not formed on the discharge surface 10*a* of the nozzle plate 10, was prepared.

As Comparative Example 2, a head, which has the part (eaves-shaped part) of the cover 103 of the above-described embodiment, and in which a liquid-repellent film is formed on the discharge surface 10*a* of the nozzle plate 10, but which is not coated with the fluorine resin 93, was prepared.

Then, leakage inspection, confirmation of a protrusion state, and cross-sectional shape observation were conducted. It has been confirmed by measurements performed in advance that in the comparative examples, the application quantities of the adhesive and the heights of the gap d were substantially the same.

In Comparative Example 1, no leakage occurred, but the protrusion to the nozzle plate 10 was large. In Comparative Example 2, no protrusion or leakage was seen. However, when the cross-sectional shape was observed, the adhesive 300 flowed out more toward the electrical member 92 than in the embodiment, and the gap d was larger in height than the gap d of the embodiment. Therefore, leakage may occur when the application quantity is close to the lower limit.

A contact angle of pure water on the discharge surface 10*a* of the nozzle plate 10, the fluorine resin 93, and the surface 103*g* on the reverse side of the bonding surface 103*a*, which is the surface bonded to the channel substrate 20, of the cover 103, i.e., the surfaces having liquid repellency in the present embodiment, is made 90° or more, and a contact angle of pure water on the bonding surface 20*a* of the channel substrate 20, and the bonding surface 103*a* of the cover 103, i.e., the surfaces having lyophilic properties, is made 40° or less. However, as long as the contact angle of pure water on the places having liquid repellency is 80° C. or more, and the contact angle of pure water on the places having lyophilic properties is 50° or less, the above-described effect and advantage of the present embodiment can be obtained.

Figure 5:
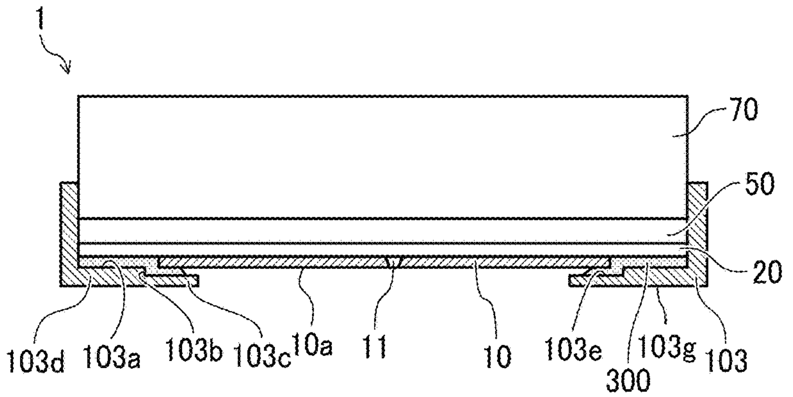
FIG. 5 is a side view of a liquid discharge head according to a second embodiment of the present embodiment.

Next, referring to FIG. 5, a liquid discharge head according to a second embodiment of the present embodiment is described.

FIG. 5 is a side view of a liquid discharge head 1.

The liquid discharge head 1 includes the cover 103 that is bonded to the channel substrate 20 by the adhesive 300. Since the configuration of the cover 103 and the way the cover 103 is bonded to the channel substrate 20 are similar to the configuration and the way of bonding in the first embodiment, explanation is omitted.

Moreover, the cover 103 is bonded to the frame member (common channel member 70), in addition to the channel substrate 20.

Next, referring to FIGS. 6A and 6B (FIG. 6), a different example corresponding to a third embodiment of the present embodiment is described.

FIGS. 6A and 6B (FIG. 6) is a plan view of a discharge surface portion of one head according to this embodiment.

In a first example illustrated in FIG. 6A, the cover 103, which covers a peripheral portion of short sides 10*b*, 10*b* of the nozzle plate 10, is provided.

In a second example illustrated in FIG. 6B, the cover 103, which covers a peripheral portion of long sides 10*c*, 10*c* of the nozzle plate 10, is provided.

In other words, in the present embodiment, the cover 103 is configured to cover the peripheral portion of a pair of opposed sides of the discharge surface 10*a* of the nozzle plate 10.

Next, referring to FIGS. 7 and 8, an example of a liquid discharge apparatus according to the present embodiment is described.

FIG. 7 is a schematic side view of a printer 500 as a liquid discharge apparatus.

FIG. 8 is a plan view of an example of a head unit of the apparatus.

The printer 500 serves as the liquid discharge apparatus. The printer 500 includes a feeder 501 to feed a continuous body P; a guide-conveyor 503 to guide and convey the continuous body P fed from the feeder 501 to a printing unit 505; a printing unit 505 to perform printing by discharging liquid onto the continuous body P to form an image on the continuous body P; a dryer 507 to dry the continuous body P; and an ejector 509 for exporting the continuous body P, for example. The continuous body may be a continuous paper strip or a continuous sheet.

The continuous body P is fed from an original winding roller 511 of the feeder 501, is guided and conveyed by each of the rollers of the feeder 501, the guide-conveyor 503, the dryer 507, and the ejector 509, and is taken up by a winding roller 591 of the ejector 509.

The continuous body P is conveyed to face (opposed to) a head unit 550 in the printing unit 505, and an image is printed by the liquid discharged from the head unit 550.

The head unit 550 includes, as illustrated in FIG. 8, two head modules 100A and 100B according to the present embodiment at a common base 552.

In the present disclosure, when the head is a liquid discharge head, it is sufficient if the liquid to be discharged has a viscosity and a surface tension at which the discharge can be made from the head. Though not particularly limited, it is preferable that the liquid may have a viscosity of 30 mPa·s or less under a normal temperature and a normal pressure, or by heating or cooling.

More specifically, specific examples of the liquid include a solution, a suspension, or an emulsion including a solvent, such as water or an organic solvent, a colorant such as dye or pigment, a polymerizable compound, a resin, a function-imparting material such as a surfactant, a biocompatible material such as DNA, amino acid, protein, or calcium, and an edible material such as a natural colorant.

These materials can be used for, for example, an inkjet ink, a surface treatment liquid, a liquid for forming components of electronic elements or light-emitting elements or for forming a resist pattern of electronic circuits, or a material liquid for three-dimensional fabrication.

Further, the liquid discharge apparatus includes an apparatus which is provided with a head module, a head unit, and the like, and drives a head to discharge liquid. The liquid discharge apparatus may be, for example, an apparatus capable of discharging liquid to a material onto which liquid can adhere, and an apparatus to discharge liquid toward gas or into liquid.

The "liquid discharge apparatus" may include devices to feed, convey, and eject the material on which liquid can adhere. The liquid discharge apparatus may further include a pretreatment apparatus to apply a treatment liquid onto the material, and a post-treatment apparatus to apply a treatment liquid onto the material having the liquid discharged.

The "liquid discharge apparatus" may be, for example, an image forming apparatus to form an image on a sheet by discharging ink, or a three-dimensional fabrication apparatus to discharge a fabrication liquid to a powder layer in which powder material is formed in layers to form a three-dimensional fabrication object.

The "liquid discharge apparatus" is not limited to an apparatus to discharge liquid to visualize meaningful images, such as letters or figures. For example, the liquid discharge apparatus may be an apparatus to form arbitrary images, such as arbitrary patterns that do not have meaning, or fabricate three-dimensional images.

The above-described term "material onto which liquid can adhere" represents a material to which liquid can at least temporarily adhere, a material to which liquid adheres and fixes, or a material to which liquid adheres to permeate through the material.

Examples of the "material onto which liquid can adhere" include recording media, such as a paper sheet, recording paper, a recording sheet of paper, a film, and cloth; electronic components, such as an electronic substrate and a piezoelectric element; and media, such as a powder layer, an organ model, and a testing cell. That is, unless particularly limited, the "material onto which liquid can adhere" includes any material on which liquid can adhere.

Examples of the "material onto which liquid can adhere" include any materials on which liquid can adhere even temporarily, such as paper, thread, fiber, fabric, leather, metal, plastic, glass, wood, and ceramic.

The "liquid discharge apparatus" may be an apparatus to relatively move the liquid discharge head and the material onto which liquid can adhere. However, the liquid discharge apparatus is not limited to such an apparatus. For example, the liquid discharge apparatus may either be a serial head apparatus that moves the liquid discharge head or a line head apparatus that does not move the liquid discharge head.

Examples of the "liquid discharge apparatus" further include a treatment liquid coating apparatus to discharge a treatment liquid to a sheet with the aim of coating a surface of the sheet with the treatment liquid to reform the surface of the sheet, and an injection granulation apparatus from which a composition liquid including raw materials dispersed in a solution is injected through nozzles to granulate fine particles of the raw materials.

The terms “image formation”, “recording”, “printing”, “image printing”, and “fabricating” used herein may be used synonymously with each other.

[Aspect 1]

A head module includes: a head including: a nozzle plate having a nozzle from which a liquid is to be discharged; a channel substrate including an individual channel communicating with the nozzle, the nozzle plate bonded to a first bonding surface of the channel substrate; and a cover covering at least one side of a discharge surface of the nozzle plate of the head. The channel substrate has a size larger than the nozzle plate, the cover has a second bonding surface bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

[Aspect 2]

The head module according to Aspect 1, further includes: a base in which the head is disposed, and a space is provided between the base and a sidewall of the channel substrate, and the second bonding surface of the cover is further bonded to the base.

[Aspect 3]

The head module according to Aspect 2, further includes: an electrical member connected to the channel substrate. The electrical member has a portion disposed in the space, and a surface of the portion of the electrical member in the space is liquid-repellent.

[Aspect 4]

In the head module according to Aspect 3, a fluorine resin is applied to the surface of the portion of the electrical member.

[Aspect 5]

In the head module according to claim 1, the cover includes: a first portion facing the nozzle plate, the first portion having a first thickness; and a second portion bonded to the channel substrate, the second portion having a second thickness larger than the first thickness.

[Aspect 6]

In the head module according to Aspect 1, the cover has a lyophilic surface facing the nozzle plate.

[Aspect 7]

In the head module according to Aspect 1, the cover has a liquid-repellent surface opposite to the second bonding surface.

[Aspect 8]

In the head module according to Aspect 1, the adhesive is curable in a room-temperature.

[Aspect 9]

In the head module according to Aspect 1, the head includes multiple heads, and the cover covers the multiple heads.

[Aspect 10]

A liquid discharge head includes: a nozzle plate having a nozzle from which a liquid is to be discharged; a channel substrate including an individual channel communicating with the nozzle, the nozzle plate bonded to a first bonding surface of the channel substrate; and a cover covering at least one side of a discharge surface of the nozzle plate, wherein the channel substrate has a size larger than the nozzle plate, the cover has a second bonding surface bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

[Aspect 11]

The liquid discharge head according to Aspect 10, further includes: a base in which the nozzle plate and the channel substrate is disposed, and a space provided between the base and a sidewall of the channel substrate, and the second bonding surface of the cover is further bonded to the base.

[Aspect 12]

The liquid discharge head according to Aspect 11, further includes: an electrical member connected to the channel substrate, and the electrical member has a portion disposed in the space, and a surface of the portion of the electrical member in the space is liquid-repellent.

[Aspect 13]

In the liquid discharge head according to Aspect 12, a fluorine resin is applied to the surface of the portion of the electrical member.

[Aspect 14]

In The liquid discharge head according to Aspect 10, the cover includes: a first portion facing the nozzle plate, the first portion having a first thickness; and a second portion bonded to the channel substrate, the second portion having a second thickness larger than the first thickness.

[Aspect 15]

In the liquid discharge head according to Aspect 10, the cover has a lyophilic surface facing the nozzle plate.

[Aspect 16]

In the liquid discharge head according to Aspect 10, the cover has a liquid-repellent surface opposite to the second bonding surface.

[Aspect 17]

A liquid discharge apparatus includes the head module according to Aspect I.

[Aspect 18]

A liquid discharge apparatus includes the liquid discharge head according to Aspect 10.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A head module comprising:

a head including:

a nozzle plate having a nozzle from which a liquid is to be discharged;

a channel substrate including an individual channel communicating with the nozzle, the nozzle plate bonded to a first bonding surface of the channel substrate; and a cover covering at least one side of a discharge surface of the nozzle plate of the head, wherein the channel substrate has a size larger than a size of the nozzle plate in a direction parallel to the channel substrate, the cover has a second bonding surface directly bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

2. The head module according to claim 1, further comprising:

a base in which the head is disposed, and a space is provided between the base and a sidewall of the channel substrate, wherein the second bonding surface of the cover is further bonded to the base.

3. The head module according to claim 2, further comprising:

an electrical member connected to the channel substrate, wherein the electrical member has a portion disposed in the space, and a surface of the portion of the electrical member in the space is liquid-repellent.

4. The head module according to claim 3, wherein a fluorine resin is applied to the surface of the portion of the electrical member.

5. The head module according to claim 1, wherein the cover includes:

a first portion facing the nozzle plate, the first portion having a first thickness; and a second portion bonded to the channel substrate, the second portion having a second thickness larger than the first thickness.

6. The head module according to claim 1, wherein the cover has a lyophilic surface facing the nozzle plate.

7. The head module according to claim 1, wherein the cover has a liquid-repellent surface opposite to the second bonding surface.

8. The head module according to claim 1, wherein the adhesive is curable in a room-temperature.

9. The head module according to claim 1, the head includes multiple heads, and the cover covers the multiple heads.

10. A liquid discharge head comprising:

a nozzle plate having a nozzle from which a liquid is to be discharged;

a channel substrate including an individual channel communicating with the nozzle, the nozzle plate bonded to a first bonding surface of the channel substrate; and a cover covering at least one side of a discharge surface of the nozzle plate, wherein the channel substrate has a size larger than a size of the nozzle plate in a direction parallel to the channel substrate, the cover has a second bonding surface directly bonded to the first bonding surface of the channel substrate at an outer region of the nozzle plate with an adhesive, the discharge surface of the nozzle plate is liquid-repellent, and the first bonding surfaces of the channel substrate and the second bonding surface of the cover are lyophilic.

11. The liquid discharge head according to claim 10, further comprising:

a base in which the nozzle plate and the channel substrate is disposed, and a space provided between the base and a sidewall of the channel substrate, wherein the second bonding surface of the cover is further bonded to the base.

12. The liquid discharge head according to claim 11, further comprising:

an electrical member connected to the channel substrate, wherein the electrical member has a portion disposed in the space, and a surface of the portion of the electrical member in the space is liquid-repellent.

13. The liquid discharge head according to claim 12, wherein a fluorine resin is applied to the surface of the portion of the electrical member.

14. The liquid discharge head according to claim 10, wherein the cover includes:

a first portion facing the nozzle plate, the first portion having a first thickness; and a second portion bonded to the channel substrate, the second portion having a second thickness larger than the first thickness.

15. The liquid discharge head according to claim 10, wherein the cover has a lyophilic surface facing the nozzle plate.

16. The liquid discharge head according to claim 10, wherein the cover has a liquid-repellent surface opposite to the second bonding surface.

17. A liquid discharge apparatus comprising the head module according to claim 1.

18. A liquid discharge apparatus comprising the liquid discharge head according to claim 10.

* * * * *